United States Patent [19]

Foster

[11] Patent Number: 5,064,052
[45] Date of Patent: Nov. 12, 1991

[54] RECIPROCATING CONVEYOR FLOOR MEMBERS AND SEALS

[76] Inventor: Raymond K. Foster, P.O. Box 1, Madras, Oreg. 97741

[21] Appl. No.: 682,458

[22] Filed: Apr. 8, 1991

[51] Int. Cl.$^5$ ............................................. B65G 25/00
[52] U.S. Cl. .................................. 198/750; 414/525.1
[58] Field of Search ...................... 198/750; 414/525.1, 414/525.9

[56] References Cited

U.S. PATENT DOCUMENTS

| | | | |
|---|---|---|---|
| 4,144,963 | 3/1979 | Hallstrom | 198/750 |
| 4,184,587 | 1/1980 | Hallstrom | 198/750 |
| 4,492,303 | 1/1985 | Foster | 198/750 |
| 4,727,978 | 3/1988 | Hallstrom, Jr. | 198/750 X |
| 4,749,075 | 6/1988 | Foster | 198/750 |
| 4,858,748 | 8/1989 | Foster | 198/750 |
| 4,896,761 | 1/1990 | Foster | 198/750 |
| 4,899,870 | 2/1990 | Foster | 198/750 |
| 4,940,132 | 7/1990 | Foster | 198/750 |
| 4,984,679 | 1/1991 | Foster | 198/750 |

Primary Examiner—D. Glenn Dayoan
Attorney, Agent, or Firm—Delbert J. Barnard

[57] ABSTRACT

In a reciprocating floor conveyor, elongated inflatable seal members (44, 44') are positioned to seal the gaps (60) between adjacent floor members (16, 16'). A base portion (52, 52') of each seal member (44, 44') is received within a base channel (46, 46') which is formed in a side portion (18) of a floor member (16). Side portion (18) includes a second channel (50, 50') in which a sealing portion (54, 54') of the sealing member (44, 44') is situated. The second side (20, 20') of each floor member (16, 16') includes a third channel (58, 58') which extends longitudinally of the floor member (16, 16') and confronts the sealing portion (54, 54') of the adjacent floor member (16, 16'). When the inflatable portion (54, 54') of the seal member (44, 44') is inflated, it extends into and contacts the inner surface of the third channel (58, 58'). When the sealing portion (54, 54') is deflated, it folds onto itself (FIGS. 11 and 13) and moves away from sealing engagement with the inner surface of channel (58, 58').

20 Claims, 7 Drawing Sheets

RECIPROCATING CONVEYOR FLOOR MEMBERS AND SEALS

DESCRIPTION

1. Technical Field

This invention relates to reciprocating floor conveyors. More particularly, it relates to the provision of an inflatable seal for sealing the gaps between the floor members of the conveyor.

2. Background Information

Simple seal strips between adjacent floor members of a reciprocating floor conveyor are well known and have been in use for many years. By way of an example, U.S. Pat. No. 4,144,963, granted Mar. 20, 1979, to Olof A. Hallstrom, discloses locating an elongated seal strip between adjacent floor members. The seal strip is connected to one of the floor members and includes an outwardly and upwardly directed lip which makes sealing contact with a confronting surface of the second floor member. The prior art seal strips rely on resilient energy for urging the sealing lip or edge into sealing contact with the floor member surface. A principal object of the present invention is to provide an inflatable seal having a sealing portion which is positively moved into sealing contact with a floor member surface, by fluid pressure introduced into the seal member.

DISCLOSURE OF THE INVENTION

The present invention is incorporated into a reciprocating floor conveyor which is basically characterized by a plurality of side-by-side elongated floor members which are advanced in a first direction to convey a load and are retracted in the opposite direction. Each floor member has a first side, a second side and an upper load supporting portion. According to the invention, an elongated inflatable seal member is positioned between adjacent floor members. Each inflatable seal member includes a base portion which is connected to a first side of a first floor member and a sealing portion which confronts the second side of an adjacent second floor member. A conduit delivers fluid into and out from the inflatable seal member. When the inflatable seal member is inflated the sealing portion of the inflatable seal member is positively urged into sealing contact with the second side of the second floor member. The sealing portion is out of sealing contact with said second side when the inflatable seal member is deflated.

In preferred form, the first side of the first floor member includes an elongated base channel in which the base portion of the inflatable seal member is situated. The sealing portion of the inflatable seal member is positioned outwardly of said base channel. The first side of the first floor member preferably also includes a second channel extending longitudinally of the floor member. The sealing portion of the inflatable seal member is located within the second channel. The second channel may be positioned directly laterally outwardly of the base channel, or it may be positioned vertically below the base channel. An advantage of the latter construction is that it provides a construction which discourages the accumulation of debris between the channel surfaces and the sealing portion of the inflatable seal member.

According to an aspect of the invention, the second side of the second floor member includes a third channel which extends longitudinally of the second floor member. The third channel confronts the second channel. The sealing portion of the inflatable seal member is constructed and positioned to project into the third channel when the inflatable seal member is deflated. The sealing portion of the inflatable seal member may be obstructed to fold inwardly on itself in the second channel when the inflatable seal member is deflated. Preferably, the second and third channels have a substantially circular curvature in cross section.

According to another aspect of the invention, the base channel includes a tubular inner portion and a slot portion which extends outwardly from the tubular portion. The base portion of the inflatable seal member is a tube part which is positioned within the tubular portion of the base channel. The sealing portion of the inflatable seal member is a larger tube part that is positioned outwardly of the slot portion. Wall parts of the base portion extend through the slot portion of the base channel and merge with wall parts of the sealing portion.

According to yet another aspect of the invention, the inflation fluid is introduced into and removed out from the base portion of the inflatable seal member. A separate fluid delivery/exhaust tube is provided for each inflatable seal member. This tube interconnects between a manifold and the inflatable seal member. Preferably, each tube is connected to the tubular base portion of its inflatable seal member. The delivery/exhaust tubes are constructed to accommodate the movement of the floor members. By way of example, the tubular member may include a telescopic section or an expandable/contractable section in the form of a coil, loop, or bellows.

Other objects, features and advantages of the invention are hereinafter described in the detailed description of the best mode.

BRIEF DESCRIPTION OF THE DRAWINGS

In the drawings, like element designations refer to like parts throughout the several views, and.

BEST MODE FOR CARRYING OUT THE INVENTION

Figure 1:
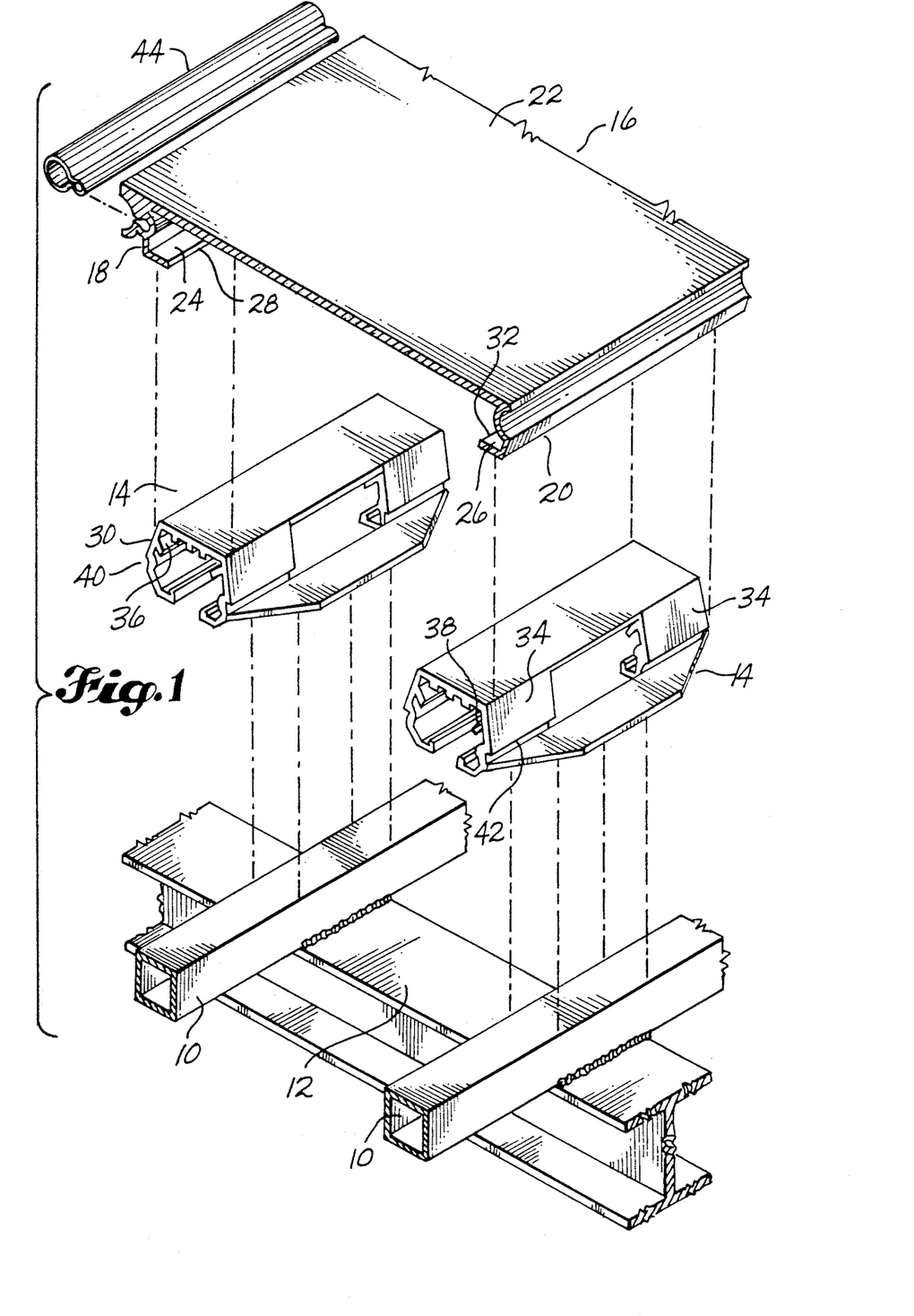
FIG. 1 is a fragmentary, exploded pictorial view showing a pair of guide beams secured to a transverse support beam, a pair of slide bearings spaced above the two guide beams, and a floor member spaced above the bearings.
Figure 2:
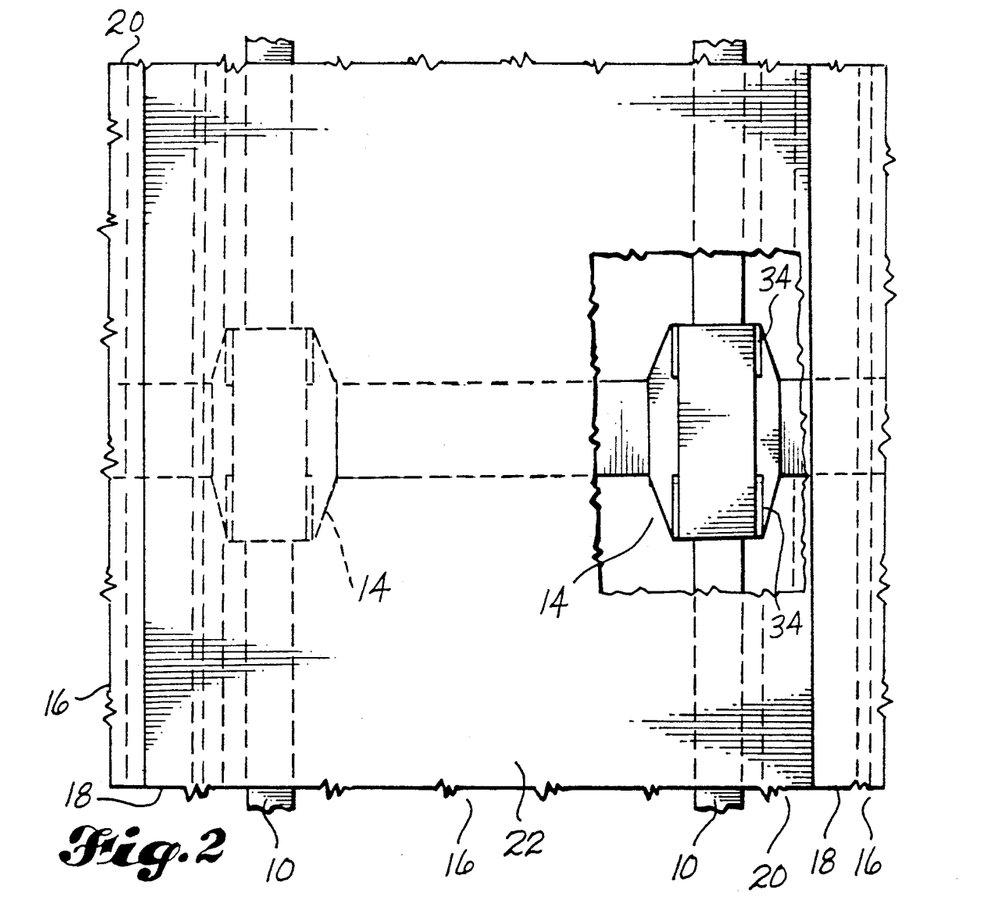
FIG. 2 is a fragmentary top plan view, looking downwardly on portions of three adjacent floor members, with a portion of the central floor member cut away to disclose a slide bearing.

FIG. 1 shows a pair of laterally spaced apart guide beams 10 secured to a transverse support beam 12. Guide beams 10 extend longitudinally of the conveyor, throughout the full length of the conveyor. As is known per se, a plurality of slide bearings 14 are secured to each guide beam 10. The bearings 14, and the method of their installation, are described in detail in my U.S. Pat. No. 4,785,929, granted Nov. 22, 1988.

Each floor member 16 is supported on and by a pair of guide beams 10. Floor member 16 includes a first side 18, a second side 20 and a load supporting upper portion 22. Preferably, a bottom flange 24 projects laterally inwardly from side 18. A second bottom flange 26 projects laterally inwardly from side 20, in coplanar parallelism with flange 24. The bearings 14 are constructed to allow floor member 16 to be snap fitted onto the bearings 14. The floor member 16 is set down onto the bearings with the inner edge 28 of flange 24 against bearing side surface 30, and inner edge 32 of flange 26 against bearing side surfaces 34. Floor member 16 is then pushed downwardly. In response, flange edges 28, 32 exert laterally inwardly directed forces on the bearing side regions 30, 34. In turn, internally ribs 36, 38 bend and the side regions 30, 34 move inwardly. Floor member 16 is moved downwardly until the flange edges 28, 32 snap into look grooves 40, 42.

The first side 18 of floor member 16 is constructed to support an inflatable seal member 44. The second side 20 of floor member 16 provides a surface which is contacted by the inflatable seal member 44 on the adjacent floor members 16, when said inflatable member is inflated, to complete a seal between the adjacent floor members 16.

Figures 3, 4:
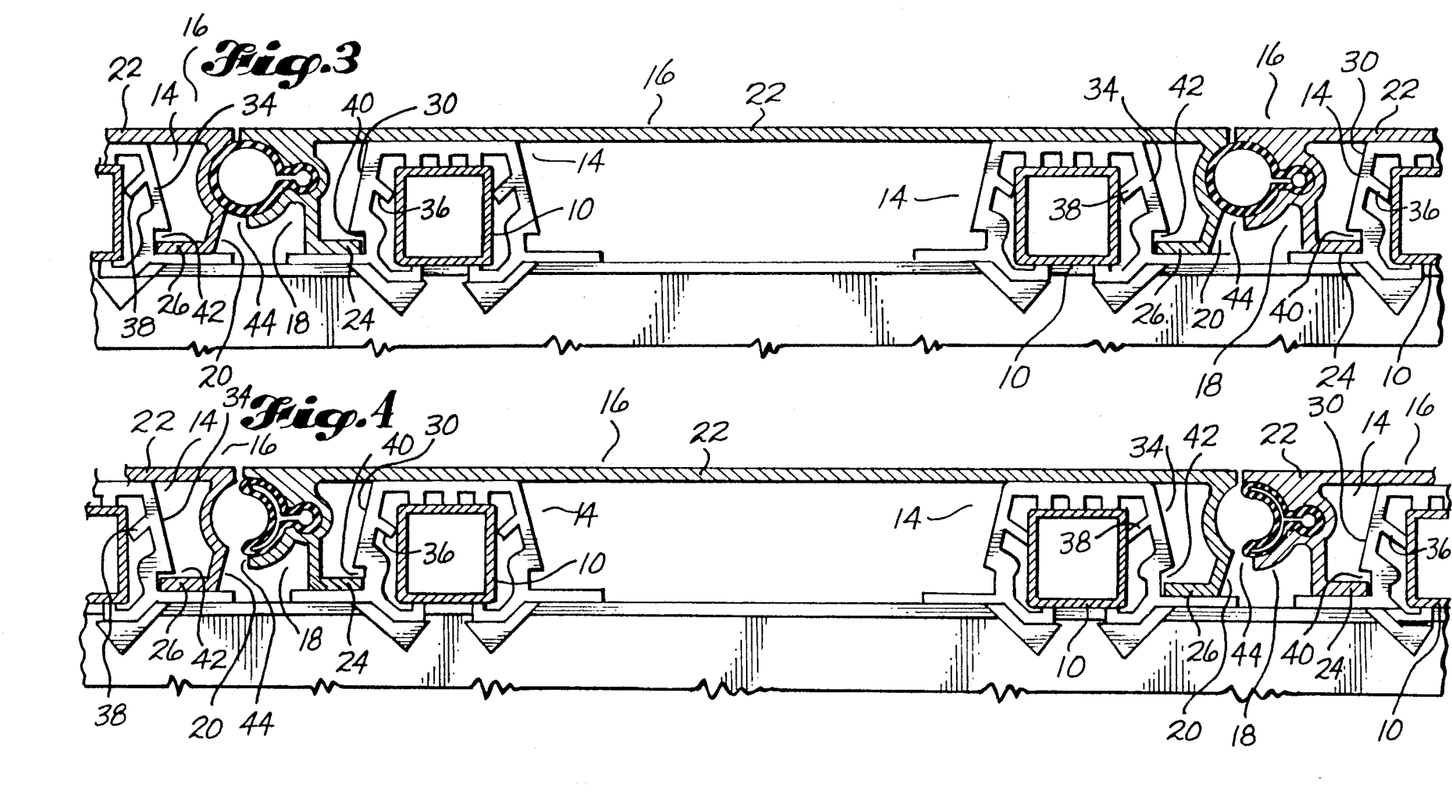
FIG. 3 is an enlarged scale sectional view taken substantially along line 3—3 of FIG. 2, such view showing inflatable seals, for sealing the gaps between adjacent floor members, in an inflated condition.
FIG. 4 is a view like FIG. 3, but showing the inflatable seals in a deflated condition.
Figure 5:
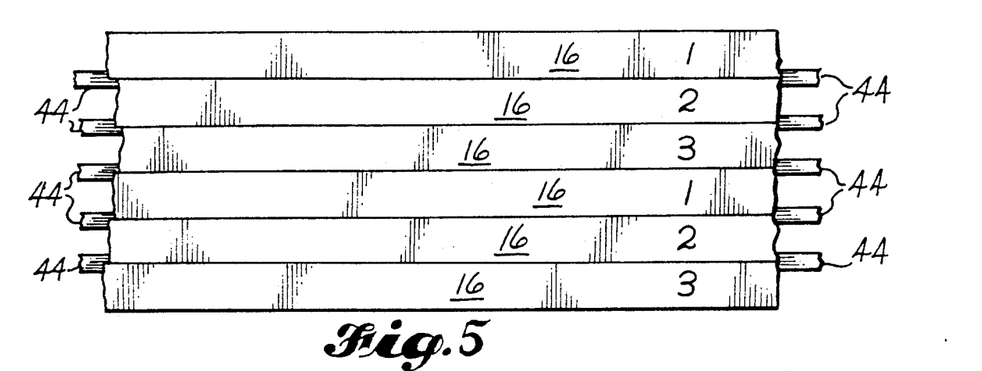
FIG. 5 is a top plan diagram of a conveyor which includes three groups of floor members, designated "1", "2" and "3", such view showing end portions of the inflatable seal members.

Referring to FIG. 5, in preferred form, the reciprocating floor conveyor is divided into three sets of floor members, designated "1", "2" and "3". The conveyor is also divided into groups, each group including one floor member "1", one floor member "2" and one floor member "3". FIG. 5 is a fragmentary length section of a two group wide portion of a conveyor. The number of floor members 16 is a variable. A typical conveyor may be composed of nine, twelve, or fifteen floor members. The length of the conveyor is also a variable. As shown by FIGS. 3 and 4, the top load contacting surfaces 22 of floor members 16 may be coplanar. The surfaces 22 may be flat, as illustrated, or may include upwardly projecting wear strips and/or a liquid collecting center channel. FIG. 5 shows portions of the inflatable seal members 44 projecting endwise of the floor members 16.

Figure 6:
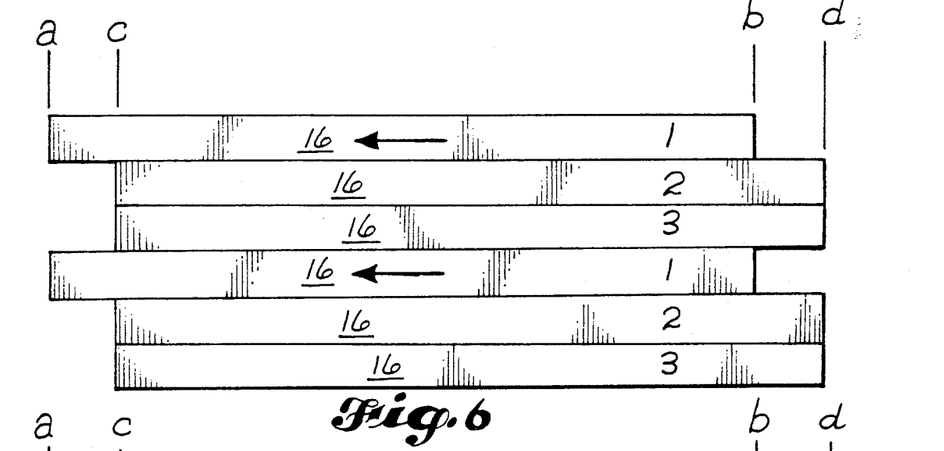
FIG. 6 is also a top plan diagram of a conveyor which includes three sets of floor members, such view showing floor members "2" and "3" in an advanced position and floor members "1" in the process of being returned to a start position.
Figure 7:
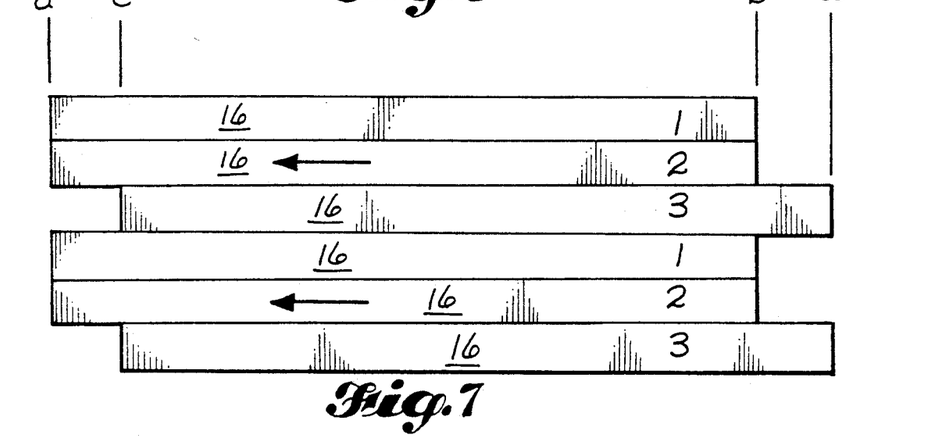
FIG. 7 is a view like FIG. 6, but showing the floor members "3" in the advanced position, the floor members "1" in a start position, and the floor members "2" in the process of returning to the start position.
Figure 8:
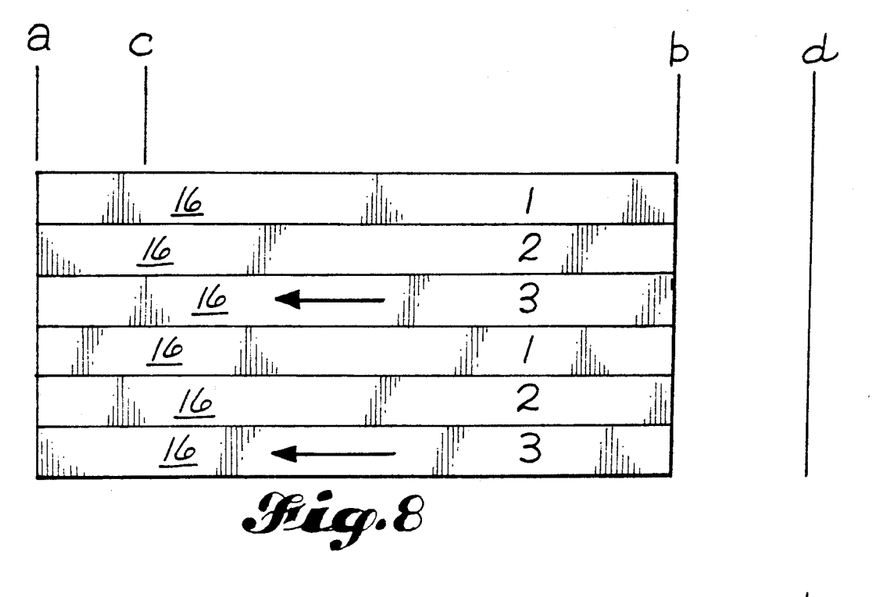
FIG. 8 is a view like FIGS. 6-7, showing slat members "1" and "2" in the start position, and showing slat members "3" in the process of being returned to the start position.
Figure 9:
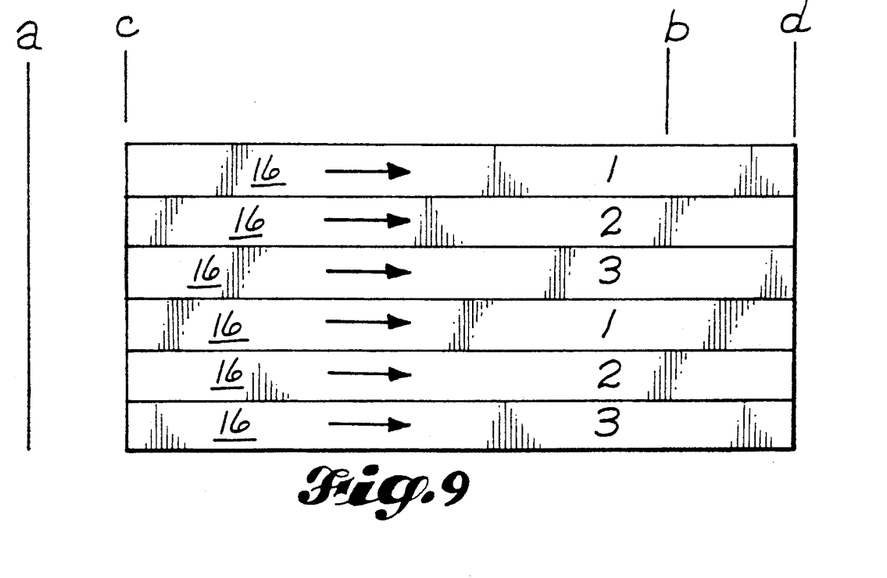
FIG. 9 is a view like FIGS. 6-8, showing all of the slat members "1", "2" and "3" in the process of being moved from the start position to the advanced position.

FIGS. 6-9 show a preferred sequence of movement of the floor members 16. A start position is indicated by the lines A-B. An advanced position is indicated by the lines C-D. FIG. 9 shows all of the floor members 16 being moved in unison towards the advanced position C-D. During this movement any load on the conveyor is moved the distance A-C. The floor members are stopped momentarily when they reach the advanced position C-D. Then, as shown by FIG. 6, the floor members "2" and "3" are held stationary at the advanced position C-D, and the floor members "1" are returned to the start position A-B. The load does not move rearwardly with floor members "1" because the area of floor members "2" and "3" is twice as large as the area of the moving floor members "1". Friction between the larger stationary area and the load holds the load substantially stationary. As shown by FIG. 7, after floor members "1" have been returned to the start position A-B, the floor members "2" are returned to the start position A-B. Then, as shown by FIG. 8, the floor members "3" are returned to the start position A-B. When all floor members 16 are at the start position A-B, the conveyor drive is reversed and all floor members 16 are again moved in unison to the advanced position C-D.

The drive mechanism for moving the floor members 16 is per se not a part of the present invention. By way of typical and therefore nonlimitive example, the drive mechanism may be like the drive mechanism disclosed in my U.S. Pat. No. 5,000,647, granted Mar. 16, 1991.

Figure 10:
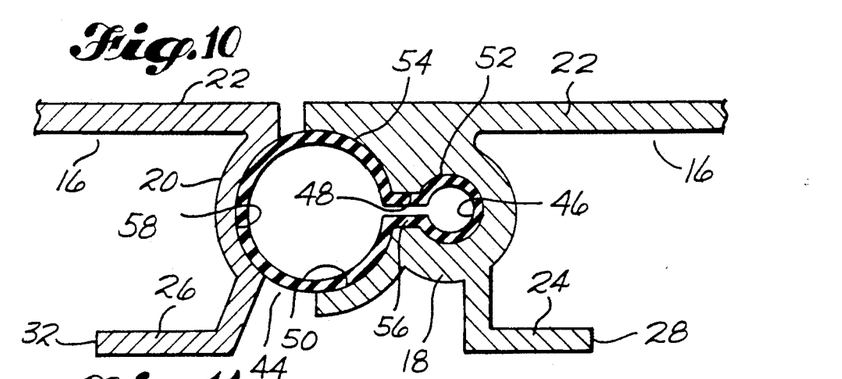
FIG. 10 is an enlarged scale fragmentary sectional view in the region of an inflatable seal member, showing the seal member in an inflated condition.
Figure 11:
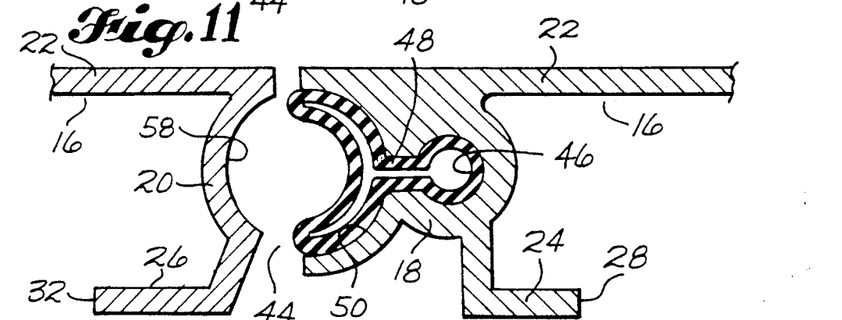
FIG. 11 is a view like FIG. 10, but showing the seal member in a deflated condition.

Referring to FIGS. 10 and 11, in preferred form, each first side portion 18 of each floor member 16 includes a base channel 46 having an inner portion which is substantially circular in cross section, and a narrow throat portion 48. Throat portion 48 extends laterally outwardly from the tubular inner portion 46. Throat portion 48 has a width dimension which is smaller than the diameter of tubular portion 46. Side portion 18 preferably also includes a second channel 50 which has a substantially semi-cylindrical shape. The inflatable seal member 44 is a single tube composed of a small diameter tubular portion 52 connected to a larger diameter tubular portion 54 by a tunnel region 56. The small tubular portion 52 constitutes a base portion of the inflatable seal member. It is received within the base channel 46. The larger diameter tubular portion 54 constitutes the sealing portion of the inflatable seal member 14. Preferably, the inflatable seal member 44 is an extrusion. Member 44 may be extruded into the shape shown by FIG. 11. FIG. 11 shows the cross-sectional configuration of the inflatable seal member 44 when such seal member 44 is deflated. The sealing portion 54 is folded inwardly on itself.

As shown by FIGS. 10 and 11, the second side 20 of each floor member 16 is preferably constructed to include a third channel 58. Channel 58 confronts channel 50 and is a concave channel, preferably of circular curvature in cross section, i.e. it is a segment of a cylinder. As shown by FIG. 10, when sealing portion 54 is inflated, it projects laterally outwardly from the second channel 50 into the third channel 58. Air pressure within sealing portion 54 urges the outer surface of portion 54 against the inner surface of channel 58. There is a positive force exerted over a substantial area. The surface contact between portion 54 and the inner surface of channel 58 is large.

Figure 12:
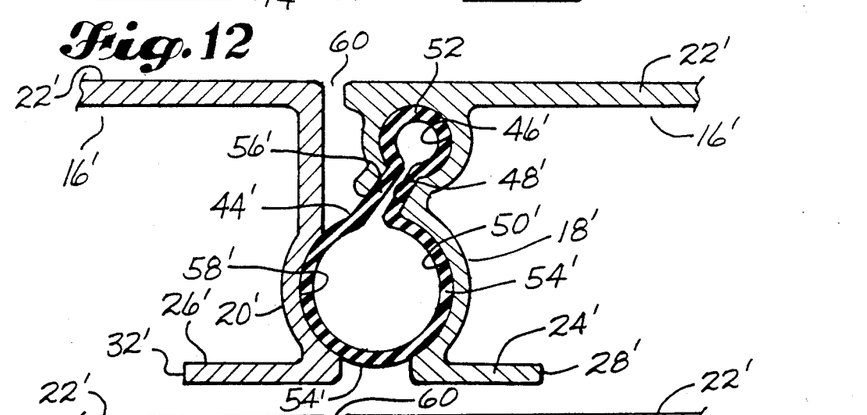
FIG. 12 is a view like FIG. 10, but showing a modified construction of the inflatable seal member.
Figure 13:
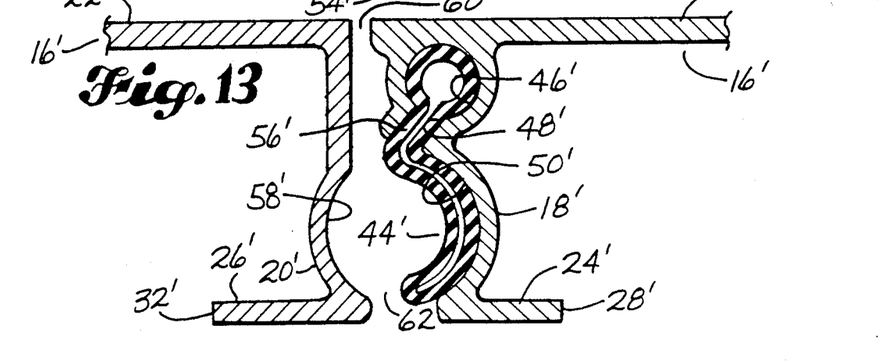
FIG. 13 is a view like FIG. 11, but showing the seal member of FIG. 12 in a deflated condition.
Figure 14:
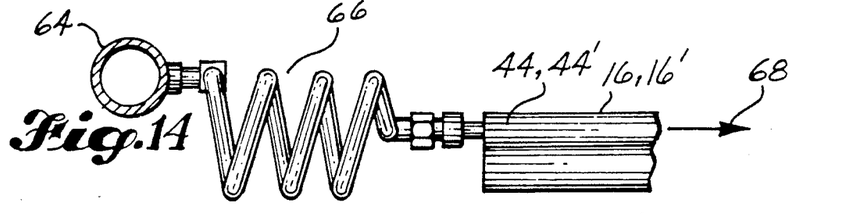
FIG. 14 is a fragmentary view at an end of a floor member, showing a variable length fluid conduit interconnected between a fluid manifold and one end of an inflatable seal member.

FIGS. 13 and 14 show a modified embodiment of the floor members 16' and the inflatable seal member 44, In this embodiment, each floor member 16' includes side portions 18', 20'. Side portion 18' includes a flange 24' having an inner edge 28'. Side portion 20' includes a flange 26' having an inner edge 32'. The floor member 16' includes an upper loading supporting portion 22'. Side portion 18' includes a base channel 46' and a second channel 50'. Channel 50' is located vertically below 46'. The two channels are connected together by a throat region 48'. The second side 20' includes a third channel 58' which confronts the second channel 50' of the adjacent floor members 16'. The deflated cross-sectional shape of the seal member 44, is shown in FIG. 13. The inflated cross-sectional shape is shown in FIG. 12. An advantage of positioning the sealing portion 54' below the base portion 52 is that it eliminates the possibility of dirt and debris being forced between the sealing portion 54 of the inflatable seal member 44 and the inner surface of channel 50'. Referring to FIG. 13, any debris entering through gap 60 is likely to fall vertically downwardly and exit through gap 62. Note that gap 60 is relatively narrow compared to the lateral space between the floor members 16' vertically below gap 60. Debris which moves through gap 60 is likely to fall downwardly through this space to and through gap 62.

Preferably, the inflation fluid is introduced into the inflatable seal members 44, 44', via the tubular base portions 52, 52'. A combined inlet/exhaust tube may be connected to each tubular base portion 52, 52'. The fluid delivery/exhaust system must accommodate the endwise movement of the floor members 16, 16'. In a typical installation, each floor member moves back and forth a distance of about six inches, i.e. distances A–C and B–D in FIGS. 6–9 are about six inches. FIGS. 14–19 show several embodiments of fluid delivery/exhaust tube assemblies. Each embodiment is shown to include a manifold 64 which can be stationary. A separate delivery/exhaust tube is provided for each floor member 16, 16'. This tube interconnects the manifold 64 and the inflatable seal member 44, 44' of its floor members 16, 16'.

FIG. 14 shows an installation in which the delivery/exhaust tube includes a helical section 66. This section 66 is manufactured to normally have its turns close together. Movement of floor member 16, 16' in the direction 68, a distance A-C (e.g. six inches) will cause the coil 66 to stretch out a like distance. A return of the floor member 16, 16' will allow the coils 66 to contract in length.

Figure 15:
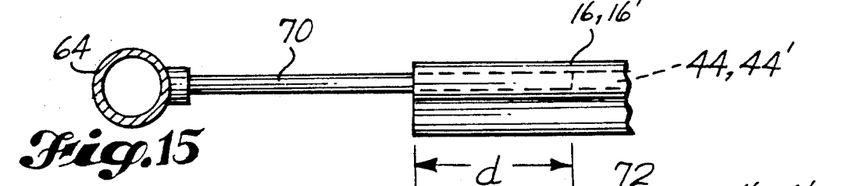
FIG. 15 is a view like FIG. 14, showing a second embodiment of the variable length fluid conduit.

FIG. 15 shows a rigid tube 70 extending from the manifold 64 into the inflatable seal member 44, 44'. Specifically it may extend into the tubular base portion 52, 52' of the inflatable seal member 44, 44'. In this embodiment tube 70 does not move. It projects into the floor member 16, 16' a distance D which is variable depending on the position of the floor member 16, 16'. The important relationship is that a portion of tube 70 is always within the inflatable seal member 44, 44' regardless of the position of the floor member 16, 16'. For example, tube 70 may project into the inflatable seal member 44, 44' a distance of about nine inches when the floor members 16, 16' is at its start position. In such example, a movement of the floor member 16, 16' a stroke length of six inches, to reposition it into the advanced position, would result in a three inch portion of tube 70 projecting into the inflatable seal member 44, 44'.

Figure 16:
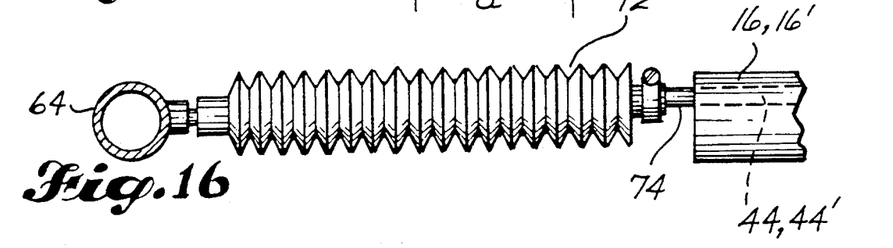
FIG. 16 is a view like FIGS. 14 and 15, showing a third embodiment of the variable length fluid conduit.

FIG. 16 shows an accordion section 72 interconnected between manifold 64 and a tube 74 which extends into the inflatable seal section 44, 44'. This accordion section 72 is capable of expanding and contracting through a distance equal to the step length of the floor member 16, 16'.

Figure 17:
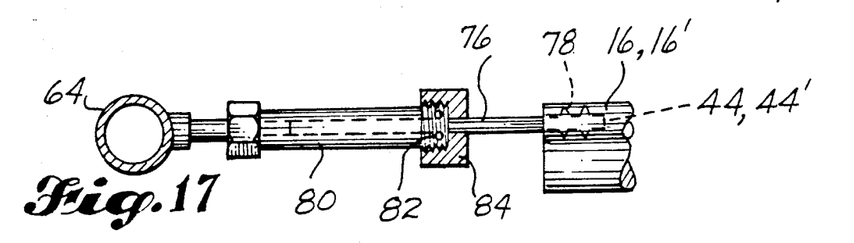
FIG. 17 is a view like FIGS. 14-16, showing a fourth embodiment of the variable length fluid conduit.

FIG. 17 shows a modified construction of a telescopic connection. In this embodiment, a tube 76 projects endwise outwardly from the inflatable seal member 44, 44'. The inserted end of portion 78 of tube 76 may include ribs which engage and grip the walls of the inflatable seal member. In this embodiment tube 76 reciprocates back and forth with the floor member 16, 16, The opposite end of tube 74 projects into a larger diameter stationary tube 80. A seal may be provided between the tube 76, 78, such as seal 72 retained by a retainer 84 which screws onto the end of tube 80.

Figure 18:
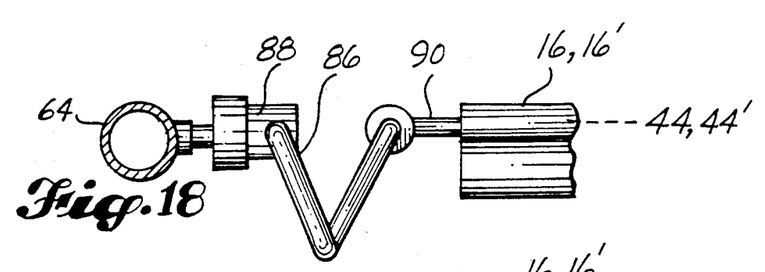
FIG. 18 is a view like FIGS. 14-17, showing a fifth embodiment of the variable length fluid conduit.

FIG. 18 shows one form of a flexible loop 86. This loop 86 is connected at one end to a nipple 88 which is connected to manifold 64. At its opposite end loop 86 is connected to a nipple 90 which extends into the inflatable seal member 44, 44'. The loop length is sufficient to allow tube 90 to move back and forth with the floor member 16, 16'.

Figure 19:
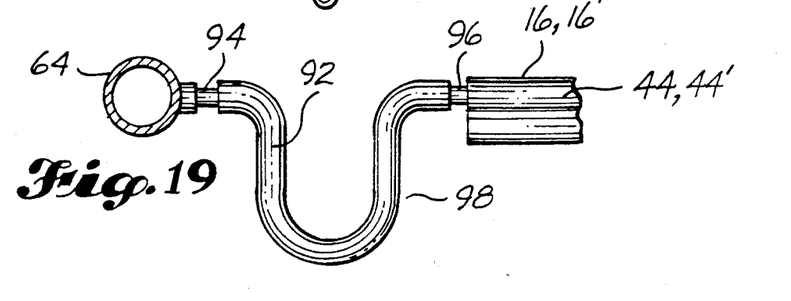
FIG. 19 is a view like FIGS. 14-18, showing a sixth embodiment of the variable length fluid conduit.

FIG. 19 illustrates a very simple connection between manifold 64 and the inflatable seal member 44, 44'. A flexible tube 92 is connected at one end to a fixed tube 94 which projects from manifold 64. The opposite end of tube 92 connects to a similar fixed tube 96 which extends into the inflatable seal member 44, 44'. Loop portion 98 of tube 92 is of sufficient length to allow tube 96 to move back and forth with the floor member 16, 16'.

The reciprocating floor conveyor may be installed in a vehicle for hauling garbage or some material which includes a liquid. Compressed air or a liquid under pressure is introduced into the inflatable seal members 44, 44' prior to the garbage or other material being loaded into the vehicle of which the conveyor is a part. The fluid pressure is chosen to inflate the seal members 44, 44' to an extent sufficient to create a substantially liquid tight seal between the sealing portions 54, 54' of the inflatable seal members 44, 44' and the contacted surface on the second floor member. After the vehicle is loaded, and after it has been used to transport the garbage or other material to a dump site, or other receiving station for the garbage, the fluid is exhausted from the inflatable seal members 44, 44'. Then, the reciprocating floor conveyor is operated to unload from the vehicle the garbage or other material.

In the past, seal strips have been used for the purpose of mechanically interconnecting the floor members so that they will move simultaneously during the unloading cycle of the conveyor. During operation of the subject conveyor, the inflatable seals 44, 44' may be inflated immediately prior to the unloading cycle, and then be deflated prior to returning the floor members "1", "2" and "3", one set at a time, back to the start position.

As previously stated, the inflatable seal members 44, 44' can be constructed by an extrusion process. They can be extruded to have a natural cross-sectional shape such as shown by FIGS. 11, 13, so that the sealing portions 44, 44' will naturally fold back on themselves when the fluid is released from the interior of the members 44, 44'. As has been done with floor members in the past, the floor members can be extruded from a metal, such as aluminum or an aluminum alloy.

The embodiments which are illustrated and described are presented to serve as examples of the invention. They also constitute best modes of the invention known to me at this time. However, my scope of protection is not to be limited by the details of these embodiments, but rather is to be determined by the claims which follow, interpreted in accordance with established rules of patent claim interpretation, including use of the doctrine of equivalents.

What is claimed is:

1. In a reciprocating floor conveyor which includes a plurality of side-by-side elongated floor members which are advanced in a first direction to convey a load and retracted in the opposite direction, the improvement comprising:
    each floor member having a first side, a second side and an upper load supporting portion;
    an elongated inflatable seal member between adjacent floor members, each inflatable seal member including a base portion connected to the first side of a first floor member, and a sealing portion confronting the second side of an adjacent second floor member; and
    a conduit for delivering fluid into and out from the inflatable seal member,
    wherein said sealing portion of the inflatable seal member is urged into sealing contact with the second side of the second floor member when the inflatable seal member is inflated, and being out of sealing contact with said second side when the inflatable seal member is deflated.

2. A reciprocating floor conveyor according to claim 1, wherein the first side of the first floor member includes an elongated base channel in which the base portion of the inflatable seal member is situated, and wherein the sealing portion of the inflatable seal member is positioned laterally outwardly of said base channel.

3. A reciprocating floor conveyor according to claim 2, wherein the first side of the first floor member includes a second channel extending longitudinally of the floor member, laterally outwardly of the base channel, said sealing portion of the inflatable seal member being located within said second channel.

4. A reciprocating floor conveyor according to claim 3, wherein the second side of the second floor member includes a third channel, extending longitudinally of the second floor member, said third channel confronting the second channel, and said sealing portion of the inflatable seal member being constructed and positioned to project into the third channel when the inflatable seal member is inflated.

5. A reciprocating floor conveyor according to claim 4, wherein the sealing portion of the inflatable seal member is constructed to fold inwardly on itself within the second channel when the inflatable seal member is deflated.

6. A reciprocating floor conveyor according to claim 2, wherein the first side of the first floor member includes a second channel extending longitudinally of the floor member, at a location vertically below the base channel, said sealing portion of the inflatable member being located within said second channel.

7. A reciprocating floor conveyor according to claim 6, wherein the second side of the second floor member includes a third channel, extending longitudinally of the second floor member, said third channel confronting the second channel, and said sealing portion of the inflatable seal member being constructed to project into the third channel when the inflatable seal member is inflated.

8. A reciprocating floor conveyor according to claim 7, wherein the sealing portion of the inflatable seal member is constructed to fold inwardly on itself within the second channel when the inflatable seal member is deflated.

9. A reciprocating floor conveyor according to claim 2, wherein the base channel includes a tubular inner portion and a slot portion which extends outwardly from the tubular portion, and wherein said inflatable seal member is a tube and the base portion is a first part of said tube positioned within the tubular portion of the base channel and said sealing portion is a second part of said tube and is positioned outwardly of said slot portion, and wherein an interconnecting intermediate part of said tube is located within said slot.

10. A reciprocating floor conveyor according to claim 9, wherein the first side of the first floor member includes a second channel extending longitudinally of the floor member, and said sealing portion of the inflatable seal member is located within said second channel.

11. A reciprocating floor conveyor according to claim 10, wherein the second side of the second floor member includes a third channel, extending longitudinally of the second floor member, said third channel confronting the second channel, and said sealing portion of the inflatable seal member being constructed to project into the third channel when the inflatable seal member is inflated.

12. A reciprocating floor conveyor according to claim 11, wherein the sealing portion of the inflatable seal member is constructed to fold inwardly on itself within the second channel when the inflatable seal member is deflated.

13. A reciprocating floor conveyor according to claim 9, wherein the first side of the first floor member includes a second channel extending longitudinally of the floor member, at a location vertically below the base channel.

14. A reciprocating floor conveyor according to claim 13, wherein the second side of the second floor member includes a third channel, extending longitudinally of the second floor member, said third channel confronting the second channel, and said sealing portion of the inflatable seal member being constructed to project into the third channel when the inflatable seal member is inflated.

15. A reciprocating floor conveyor according to claim 14, wherein the sealing portion of the inflatable seal member is constructed to fold inwardly on itself within the second channel when the inflatable seal member is deflated.

16. A reciprocating floor conveyor according to claim 9, wherein said conduit means is connected to the base portion of the inflatable seal member.

17. A reciprocating floor conveyor according to claim 16, wherein said conduit includes a stationary portion and a movable portion interconnected between the stationary portion and the base portion of the inflatable seal member.

18. A reciprocating floor conveyor according to claim 16, wherein the first side of the first floor member includes a second channel extending longitudinally of the floor member, said sealing portion of the inflatable member being located within said second channel.

19. A reciprocating floor conveyor according to claim 18, wherein the second channel is located vertically below the base channel.

20. A reciprocating floor conveyor according to claim 18, wherein the second side of the floor member includes a first channel, extending longitudinally of the second floor member, said third channel confronting the second channel, and said sealing portion of the inflatable seal member being constructed to project into the third channel when the inflatable seal member is inflated.

* * * * *

UNITED STATES PATENT AND TRADEMARK OFFICE
CERTIFICATE OF CORRECTION

PATENT NO. : 5,064,052
DATED : November 12, 1991
INVENTOR(S) : Raymond Keith Foster It is certified that error appears in the above-identified patent and that said Letters Patent is hereby corrected as shown below:

Column 2, line 5, "obstructed" should be -- constructed --.

Column 3, line 57, "look" should be -- lock --.

Column 5, line 12, "member 44," should be -- member 44'. --.

Column 5, line 24, "member 44," should be -- member 44' --.

Column 6, lines 23 and 24, "floor member 16, 16," should be -- floor member 16, 16'. --.

Signed and Sealed this

Twenty-third Day of March, 1993

*Attest:*

*Attesting Officer*

STEPHEN G. KUNIN

*Acting Commissioner of Patents and Trademarks*